US009178223B2

United States Patent
Watanabe et al.

(10) Patent No.: US 9,178,223 B2
(45) Date of Patent: Nov. 3, 2015

(54) FUEL CELL SEPARATOR AND METHOD FOR MANUFACTURING THE SAME

(75) Inventors: Yusuke Watanabe, Toyota (JP); Yoshinobu Kurosaki, Neyagawa (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 228 days.

(21) Appl. No.: 12/473,329

(22) Filed: May 28, 2009

(65) Prior Publication Data

US 2009/0297921 A1 Dec. 3, 2009

(30) Foreign Application Priority Data

May 30, 2008 (JP) .................................. 2008-143546

(51) Int. Cl.
| | |
|---|---|
| H01M 8/04 | (2006.01) |
| H01M 4/82 | (2006.01) |
| H01M 8/02 | (2006.01) |
| H01M 8/10 | (2006.01) |

(52) U.S. Cl.
CPC .......... *H01M 8/0221* (2013.01); *H01M 8/0206* (2013.01); *H01M 8/0228* (2013.01); *H01M 8/021* (2013.01); *H01M 2008/1095* (2013.01); *Y02E 60/50* (2013.01); *Y10T 29/49115* (2015.01)

(58) Field of Classification Search
USPC ......................................................... 429/129
See application file for complete search history.

(56) References Cited

U.S. PATENT DOCUMENTS

| | | | | |
|---|---|---|---|---|
| 6,348,279 | B1 * | 2/2002 | Saito et al. ..................... | 429/509 |
| 2003/0091746 | A1 * | 5/2003 | Takahashi et al. ......... | 427/385.5 |
| 2003/0138599 | A1 * | 7/2003 | Kamikubo ..................... | 428/141 |
| 2006/0025305 | A1 * | 2/2006 | Suzuki et al. ................. | 503/201 |

FOREIGN PATENT DOCUMENTS

| | | | | |
|---|---|---|---|---|
| JP | 2002-15750 | | 1/2002 | |
| JP | 2004 285310 | * | 10/2004 | |
| JP | 2004285310 | * | 10/2004 | |
| JP | 20044285310 | * | 10/2004 | ................ C08J 7/04 |
| JP | 2005-149749 | | 6/2005 | |
| JP | 2005 216605 | * | 8/2005 | |
| JP | 2005216605 | * | 8/2005 | |
| JP | 2007-12300 | | 1/2007 | |
| JP | 2007 012300 | * | 1/2007 | |
| JP | 2007012300 | * | 1/2007 | |
| JP | 2007-141819 | | 6/2007 | |
| JP | 2007 242576 | * | 9/2007 | |
| JP | 2007-242576 | * | 9/2007 | |

* cited by examiner

*Primary Examiner* — Bijay Saha
(74) *Attorney, Agent, or Firm* — Finnegan, Henderson, Farabow, Garrett & Dunner, LLP

(57) ABSTRACT

A fuel cell separator 60 having a metal plate and an anticorrosion resin coating layer 55 formed thereon is provided, with which adhesion between the resin coating layer 55 and its counterpart member is further increased and the durability of a fuel cell unit is improved. In forming the fuel cell separator 60 having a separator substrate 50 that is a metal plate and an anticorrosion resin coating layer 55 formed thereon, the resin coating layer 55 is formed such that it has a surface roughness Ra of 0.5 to 13.5 μm. Increasing the surface roughness will produce an anchoring effect, which will improve the adhesive force at the interface. The aforementioned surface roughness Ra can be obtained either with the use of fillers that are mixed into the resin coating layer 55 or with external force applied to the surface of the resin coating layer 55 by means of shot blasting, for example.

9 Claims, 5 Drawing Sheets

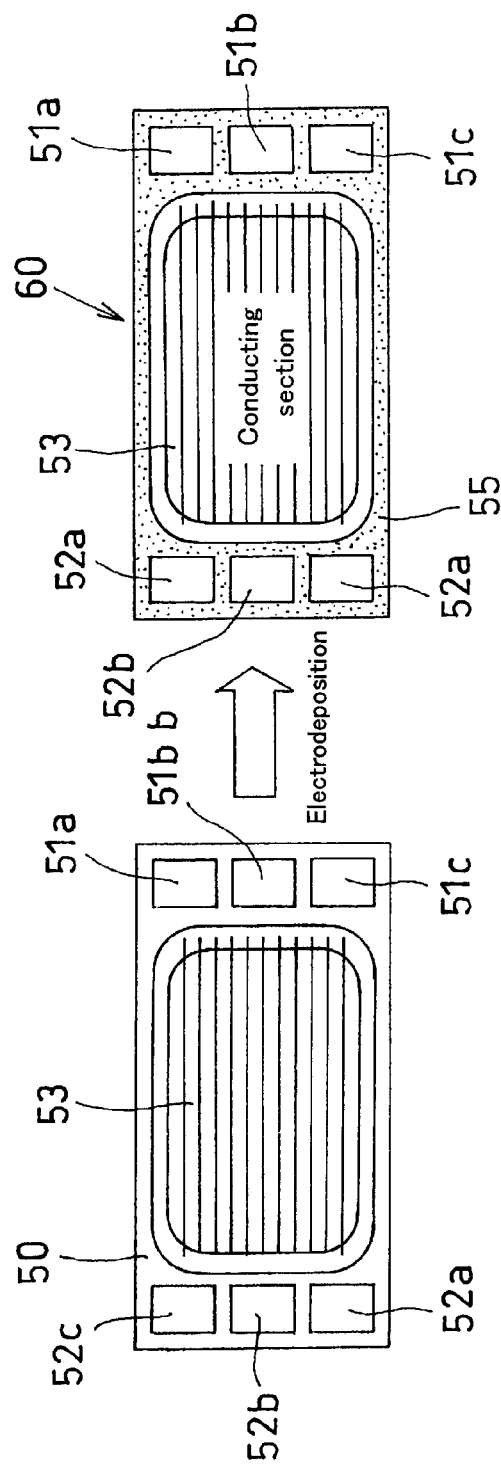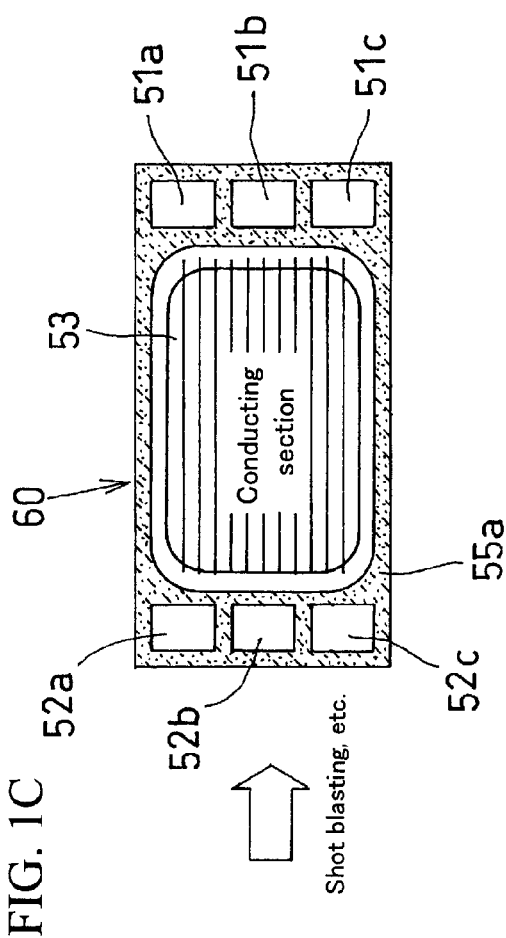

FUEL CELL SEPARATOR AND METHOD FOR MANUFACTURING THE SAME

BACKGROUND OF THE INVENTION

1. Field of the Invention

The present invention relates to a fuel cell separator and a method for manufacturing the same.

2. Background Art

As typical examples of fuel cells, polymer electrolyte fuel cells are known. FIG. 7 is a cross-sectional view illustrating an example of such a fuel cell, in which a membrane electrode assembly 3 having an electrolyte membrane 1 and a pair of electrode layers 2 each of which has a sequential stack of a catalyst layer 21 and a diffusion layer 22 and is formed on each side of the electrolyte membrane 1 is provided, and the opposite sides of the membrane electrode assembly 3 are sandwiched between separators 5,5 each having gas flow channels 4, whereby a single fuel cell unit is formed. An electrolyte membrane 1a protrudes beyond the periphery of the electrode layers 2, and a space between the protruding electrolyte membrane 1a and the separators 5 is filled with a gasket 6 as an adhesive having a sealing function in such a manner that all of the members are integrated, whereby sealing between the two electrode layers 2,2 is ensured. Though not shown, a resin frame may be disposed between the gasket 6 and the separator 5 in some cases. In such a case, an adhesive is further applied between the resin frame and the separator so that they are integrated.

In order for a fuel cell unit to exhibit excellent power generation performance over a long period of time, the durability of the seal between the gasket and the separator or between the resin frame and the separator can be an important factor. However, since product water that will be produced by a power generation reaction contains acids, fluorine ions, and the like, such product water containing acids, fluorine ions, and the like could cause the bonding interface between the gasket 6 and the separator 5 or the bonding interface between the resin frame and the separator to deteriorate, thus failing to ensure seal durability. In an extreme case, the separator could become corroded due to the influence of the product water.

In order to avoid the aforementioned problem, Reference 1 (JP Patent Publication (Kokai) No. 2007-12300 A) discloses a fuel cell separator in which an anticorrosion resin coating layer is formed on part of the surface of the separator (a region corresponding to a non-power generating region of the surface of the separator). With such a resin coating layer formed, the anticorrosive effect of the separator can be increased. In addition, when a seal member such as an adhesive or a gasket is disposed on the separator with the resin coating layer interposed therebetween, seal durability would also be ensured. The resin coating layer is formed by, for example, electrodepositing a cationic resin, which has been obtained by ionizing resin powder such as epoxy resin, urethane resin, acrylic resin, or polyimide resin, on the surface of the separator.

As another example of a fuel cell separator that solves the same technical problem, Reference 2 (JP Patent Publication (Kokai) No. 2007-242576 A) discloses a fuel cell separator and a method for manufacturing the same, in which cathodic electrolysis in an alkaline solution is applied to a surface of a peripheral portion of a separator made of stainless steel, excluding gas flow channels (a conducting section), so that a hydrated iron oxide film is formed on the surface of the peripheral portion of the separator, and further, a resin sheet layer made of an aqueous electrodeposition resin is electrodeposited on the hydrated iron oxide film. Examples of such aqueous electrodeposition resins include amine resins.

Hydrophilic aqueous resins are environmentally friendly materials and are often used as materials of resin coating layers. However, since a separator made of stainless steel has a surface on which a passive film made of a chromium oxide layer is formed, the separator has low affinity for hydrophilic aqueous resins. Thus, when a resin sheet layer made of an aqueous electrodeposition resin is directly formed on the surface of the separator made of stainless steel, the resin would have low adhesion to the separator and thus could easily peel off the separator. Thus, when a hydrated iron oxide film is formed at the interface between the surface of the separator made of stainless steel and the resin coating layer as described in Reference 2, adhesion between the separator and the resin coating layer increases, whereby a fuel cell separator with high corrosion resistance and increased durability can be provided.

SUMMARY OF THE INVENTION

The inventors have conducted continuous studies and experiments on fuel cell units that employ fuel cell separators including the aforementioned anticorrosion resin coating layer as parts of the components of the separators. They found that although a dense, uniform resin coating layer can be obtained through electrodeposition of a resin coating layer on the surface of a metal separator, there is a limitation in adhesive force obtained between the resin coating layer and its counterpart member; for example, adhesive force between the resin coating layer and a resin frame or between the resin coating layer and a gasket. This is because the surface planarity of the resin coating layer is extremely high. Thus, they learned that that there is still room for improvement of design of fuel cell units in order that fuel cell units with high power generation performance and high durability that are expected to be achieved in the future can be provided.

The present invention has been made based on the aforementioned experience. It is an object of the present invention to provide a fuel cell separator and a method for manufacturing the same, in which the fuel cell separator has a metal plate and an anticorrosion resin coating layer formed thereon, and adhesion between the resin coating layer and its counterpart member (for example, adhesion between the resin coating layer and a resin frame or between the resin coating layer and a gasket) is further increased, whereby the power generation performance and durability of a fuel cell unit to be manufactured are further increased.

A fuel cell separator of the present invention is a fuel cell separator including a metal plate and an anticorrosion resin coating layer formed thereon, in which the surface roughness Ra of the resin coating layer is 0.5 to 13.5 µm. In the present invention, the surface roughness Ra refers to the center-line mean roughness; that is, the mean value of profile peak heights and valley depths from the centerline.

When the resin coating layer has the aforementioned surface roughness, an anchoring effect is produced at the interface between the stacked layers, whereby adhesion between the resin coating layer and its counterpart member (for example, adhesion between the resin coating layer and a resin frame or between the resin coating layer and a gasket) would be increased, compared to a case in which the surface of the resin coating layer is flat. Thus, a fuel cell unit constructed with the fuel cell separator of the present invention can have high durability with little possibility of delamination or the like.

As will be described in the "example" section, when the surface roughness Ra of the resin coating layer is less than 0.5 µm, the interface between the stacked layers cannot have a sufficient anchoring effect. Thus, a significant increase in adhesive force will not occur. Meanwhile, a surface roughness Ra of greater than 13.5 μm is not preferable because such roughness could result in gas leakage from the interface between the stacked layers.

In one embodiment of the fuel cell separator of the present invention, the aforementioned resin coating layer includes fillers, and the aforementioned surface roughness Ra is provided by the presence of the fillers. Exemplary materials of fillers include acrylic resin particles, polyester resin particles, epoxy resin particles, and urethane resin particles. The volume mean particle diameter of the fillers is preferably about 50 to 100 nm. When the volume mean particle diameter of the fillers is less than 50 nm, it is difficult for the resin coating layer to have a surface roughness Ra of greater than or equal to 0.5 μm. Meanwhile, when the volume mean particle diameter of the fillers is over 100 nm, the resin coating layer will be likely to have a surface roughness Ra of over 13.5 μm. Exemplary fillers, which are preferable in terms of easy availability and dispersion properties, are acrylic resin particles with a volume mean particle diameter of 50 to 100 nm. Note that the volume mean particle diameter can be determined with a laser light scattering method.

In another embodiment of the fuel cell separator of the present invention, the surface roughness Ra is imparted as a result of roughening treatment applied to the surface of the resin coating layer formed. Examples of roughening treatment to be applied include shot blasting, plasma treatment, corona treatment, and liquid honing.

A method for manufacturing a fuel cell separator according to one aspect of the present invention is a method for manufacturing a fuel cell separator in which an anticorrosion resin coating layer is formed on a metal plate, the method including at least a step of electrodepositing fillers and an aqueous resin included in an electrocoating material, in which the content of the fillers is greater than or equal to 10 mass %, on part of the surface of the metal plate, thereby forming a resin coating layer with a surface roughness Ra of 0.5 to 13.5 μm.

Materials, volume mean particle diameter, and the like of the fillers can be the same as those given as examples in the description of a fuel cell separator earlier. Preferably, an electrocoating material that includes acrylic resin particles with a volume mean particle diameter of 50 to 100 nm as fillers is used.

As described above, when electrodeposition coating is performed with the use of an electrocoating material including fillers, it is possible to form a dense, uniform resin coating layer and impart a desired roughness Ra to the surface of the resin coating layer formed.

A method for manufacturing a fuel cell separator according to another aspect of the present invention is a method for manufacturing a fuel cell separator in which an anticorrosion resin coating layer is formed on a metal plate, the method including at least the following steps: forming a resin coating layer by electrodepositing an aqueous resin included in an electrocoating material on part of the surface of the metal plate, and applying roughening treatment to the surface of the thus formed resin coating layer with external force so as to impart a surface roughness Ra of 0.5 to 13.5 μm.

Examples of roughening treatment to be applied include shot blasting, plasma treatment, corona treatment, and liquid honing. Among such forms of treatment, shot blasting is preferable in terms of ease of treatment. In shot blasting, a metal plate (separator) having a resin coating layer formed on its surface is appropriately masked and the surface of the resin coating layer is blasted with particles (media) of alumina, TiC, or the like with a particle diameter of, for example, 5 to 50 μm, whereby a desired surface roughness can be imparted to the surface of the resin coating layer.

According to the present invention, an improved fuel cell separator is provided, which has a metal plate and an anticorrosion resin coating layer formed thereon and which has high corrosion resistance and is capable of ensuring high seal durability over a long period of time when built into a fuel cell unit.

BRIEF DESCRIPTION OF THE DRAWINGS

In the accompanying drawings:

FIGS. 1A to 1C are views for illustrating the steps of manufacturing a fuel cell separator of the present invention;

DESCRIPTION OF SYMBOLS

Figure 2:
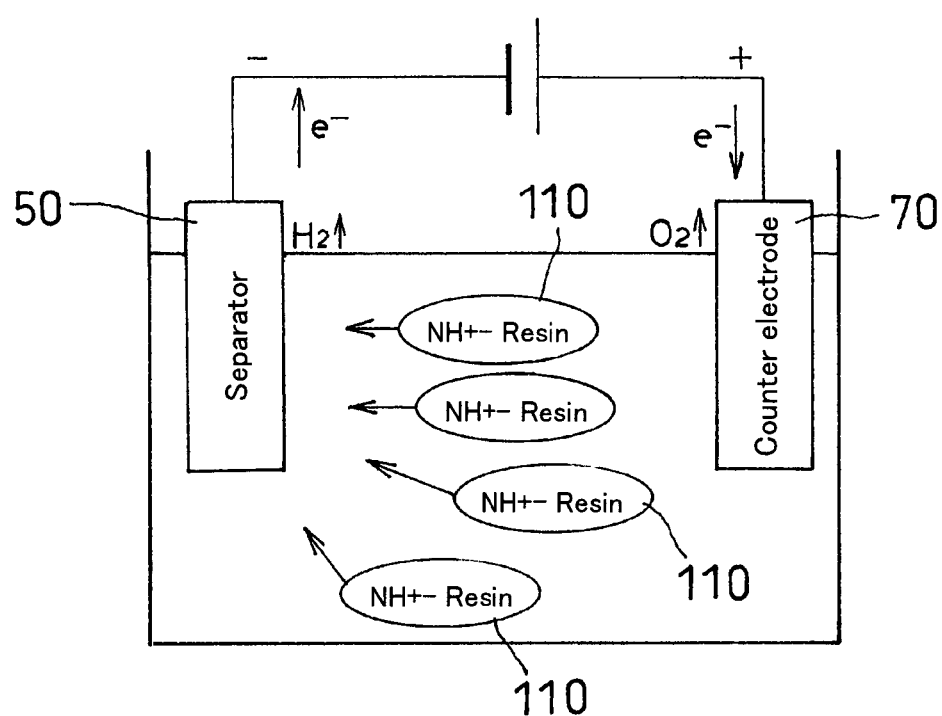
FIG. 2 is a schematic view for illustrating an embodiment in which a resin coating layer of a fuel cell separator of the present invention is formed by electrodeposition coating.

50 separator substrate
55 anticorrosion resin coating layer
55*a* resin coating layer with increased surface roughness
60 separator with a resin coating layer
61 resin frame
62 adhesive layer
63 gasket

DETAILED DESCRIPTION OF THE PREFERRED EMBODIMENTS

Preferred embodiments of the present invention will be described hereinafter with reference to the accompanying drawings.

FIGS. 1A to 1C are views for illustrating an embodiment of a fuel cell separator according to the present invention. As shown in FIG. 1A, a metal plate is used as a separator substrate 50. Examples of metal plates include, but are not limited to, plates made of austenitic stainless steel such as SUS304, SUS305, SUS310, SUS 316, and SUSMX7; and plates made of ferritic stainless steel such as SUS430. In addition, titanium, iron, aluminum, and the like can also be used.

Feed communication holes 51*a*, 51*b*, and 51*c* through which fuel gas, oxidant gas, and cooling water are fed, and discharge communication holes 52*a*, 52*b*, and 52*c* through which the fuel gas, oxidant gas, and cooling water are discharged are provided at the opposite ends of the separator substrate 50. Further, the separator substrate 50 is provided with gas flow channels 53 with projecting/recessed groove patterns, through which supplied fuel gas or oxidant gas flows. A region in which the gas flow channels 53 are provided is a conducting section positioned opposite a power-generation section of a membrane electrode assembly.

In this embodiment, an anticorrosion resin coating layer 55 is provided in regions except for the conducting section of the separator substrate 50. In the illustration, the resin coating layer 55 is formed through electrodeposition coating of an ionized aqueous resin as shown in the schematic view of FIG. 2. However, the method of forming the resin coating layer 55 is not limited thereto. In the example shown in FIG. 2, a negative voltage is applied to the separator substrate 50 with a masked conducting section and a positive voltage is applied to a counter electrode 70, in a solution containing aqueous resins ($NH^+$-resins) 110 that have been obtained by ionizing a portion of the resin powder with $NH^+$, for example. Accordingly, the aqueous resins 110 are drawn to an unmasked region of the separator substrate 50, thereby bonding to the surface thereof. By such electrodeposition coating, the resin coating layer 55, which is dense and uniform and has a flat surface, is formed on the surface of the separator substrate 50, except for at the masked region, as shown in FIG. 1B. If necessary, baking treatment at about 150 to 250° C., or desirably about 200° C. can be applied to the resin coating layer 55 so that the resin coating layer 55 can be formed in a denser and more uniform manner. Examples of such aqueous resins include epoxy resins, urethane resins, acrylic resins, and polyimide resins.

Figure 3A:
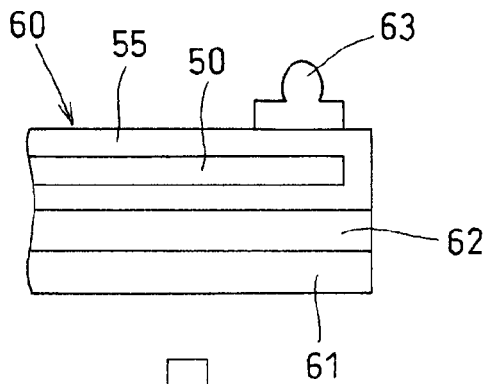
FIGS. 3A and 3B are schematic partial enlarged views of fuel cell units in which a prior-art fuel cell separator is used and in which a fuel cell separator of the present invention is used, respectively.

FIG. 3A is a partial schematic view of a fuel cell unit that is formed using a separator 60 having the thus formed resin coating layer 55. In FIG. 3A, reference numeral 61 denotes a resin frame disposed between a membrane electrode assembly (not shown) and the separator 60. The resin frame 61 and the separator 60 are bonded so as to be integrated with each other with an adhesive layer 62 interposed therebetween. Reference numeral 63 denotes an example of a gasket used to ensure sealing properties in construction of a fuel cell unit. As shown, the surface of the resin coating layer 55 formed by electrodeposition coating is flat. Thus, there is a possibility that adhesion at the bonding interface between the resin coating layer 55 and its counterpart member (in the illustration, the bonding interface between the resin coating layer 55 and the adhesive layer 62 interposed between the resin frame 61 and separator 60, and the bonding interface between the resin coating layer 55 and the gasket 63) may be insufficient. In that case, shear stress could be generated at each bonding interface, causing interfacial delamination, due to the repeated cooling/heating cycles in the course of the use of the fuel cell unit, for example.

In order to avoid such a circumstance, according to one embodiment of a separator of the present invention, roughening treatment is applied to the surface of the resin coating layer 55 formed by electrodeposition coating, so that a surface roughness Ra of 0.5 to 13.5 μm is imparted to the surface. Examples of roughening treatment include so-called shot blasting in which the target surface is blasted with metal particles or the like. FIG. 1C shows a separator 60 that has been subjected to roughening treatment. Thus, a resin coating layer 55a with increased surface roughness is obtained.

Figure 3B:
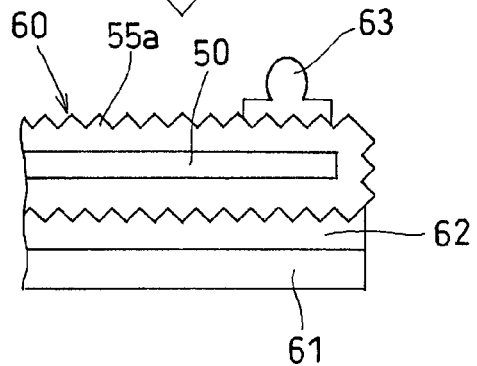

FIG. 3B is a view corresponding to FIG. 3A, in a case in which the separator 60 that has been subjected to roughening treatment is used. Since the surface of the resin coating layer 55a has desired projections and recessions, it has an increased area for bonding to the counterpart member, and thus it has increased adhesion response points with the aid of intermolecular bonds. Further, since an anchoring effect is produced, the adhesive force between the two layers is significantly increased. Accordingly, adhesion at the bonding interface is significantly increased, whereby peeling that would occur at the bonding interface is suppressed and the durability of the fuel cell unit is significantly increased.

When shot blasting is applied as roughening treatment to the surface of the resin coating layer, the surface roughness to be obtained can be appropriately changed with appropriate control of the pressure, time, and type of blasting media used. As other examples of roughening treatment, it is also possible to apply plasma treatment, corona treatment, liquid honing, or the like. In the case of plasma treatment or corona treatment, for example, a desired surface roughness can be obtained with appropriate control of the current, time, interelectrode distance, and the like, while in the case of liquid honing, a desired surface roughness can be obtained with appropriate control of the pressure, time, type of honing media, and the like.

According to an alternative embodiment of a separator and a method for manufacturing the same of the present invention, an electrocoating material including fillers, which are capable of taking on aqueous properties by being ionized with an appropriate means, is used in performing electrodeposition coating. For the fillers, those mentioned earlier are preferably used. The resin included in the electrocoating material can also be the same as that mentioned earlier. When electrodeposition coating is performed with such an electrocoating material in a manner similar to that described with reference to FIG. 2, it is possible to form a separator having a resin coating layer with a surface roughness Ra of 0.5 to 13.5 μm without the need to apply the aforementioned roughening treatment following the electrodeposition coating. As will be described in the "example" section, the content of the fillers has a substantially proportional relationship to the surface roughness Ra of the resin coating layer 55 formed. However, when the content of the fillers is less than 10 mass %, it is impossible to form the resin coating layer 55 with a surface roughness Ra that is greater than or equal to 0.5 μm.

When electrodeposition coating is performed with the use of an electrocoating material including fillers, it is possible to change the surface roughness of the resin coating layer as desired not only by controlling the content of fillers but also by retarding the speed of stirring a coating material or the speed of thermally curing the resin coating layer, for example.

Figure 4:
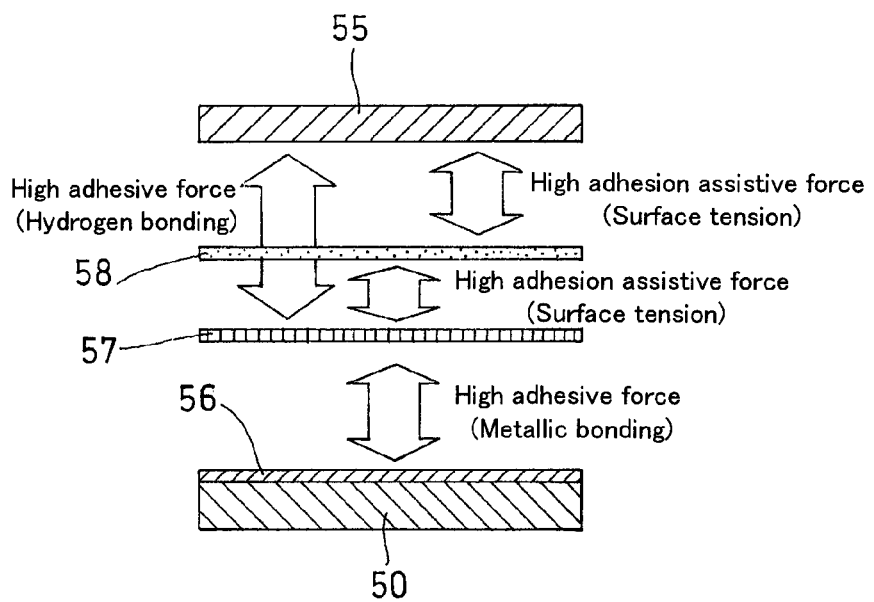
FIG. 4 is a schematic view illustrating an aspect of bonding between a separator substrate and a resin coating layer according to another embodiment of a fuel cell separator of the present invention.

Next, a variation in which stainless steel is used as the separator substrate 50 will be described with reference to FIG. 4. When the separator substrate 50 is stainless steel, a passive film 56 made of a chromium oxide film is deposited on the surface of the separator substrate 50 as shown in FIG. 4. When the resin coating layer 55 is to be formed with the use of an aqueous resin as an environmentally friendly material, there is a possibility that the resin could peel off the passive film 56 due to thermal expansion or the like that would occur during the use of the fuel cell unit, because the passive film 56 has low affinity for aqueous resins and thus has low adhesive force. In order to avoid such a circumstance, cathodic electrolytic treatment in an alkaline solution is applied in advance to a region of the separator substrate 50 on which the resin coating layer 55 is to be formed, so that a hydrated iron oxide film 57 is formed. Further, wet treatment with water is applied to the surface of the thus formed hydrated iron oxide film 57, so that a water-treated layer 58 is formed. Then, an aqueous resin is electrodeposited on the hydrated iron oxide film that has been subjected to the wet treatment with water, whereby the resin coating layer 55 is formed.

In the aforementioned case, the alkaline solution used is an electrolytic treatment solution. For example, a 5 to 50 mass % sodium hydroxide solution is used, or an aqueous solution obtained by adding 0.2 to 20 mass % trisodium phosphate, 12-hydrate or 0.2 to 20 mass % sodium carbonate as a buffering agent to a 5 to 50 mass % sodium hydroxide solution is used. The treatment is applied under the conditions of, for example, a liquid temperature of 20 to 95° C., a current density of greater than or equal to 0.5 A/dM$^2$, and a processing time that is greater than or equal to 10 seconds.

In the aforementioned separator, the hydrated iron oxide film 57 formed by cathodic electrolytic treatment in an alkaline solution is deposited on the passive film 56 that is present on the surface of the separator substrate 50 made of stainless steel. Thus, the separator substrate that has been subjected to the electrolytic treatment can maintain the corrosion resistance of the separator substrate before being subjected to electrolytic treatment. Further, since the hydrated iron oxide film 57 and the passive film 56 on the separator substrate 50 are similar in composition, they have a high degree of adhesion to each other with the aid of metallic bonding. In addition, when the surface of the hydrated iron oxide film 57 is subjected to water treatment to form the water-treated layer 58, wettability of the surface of the hydrated iron oxide film 57 with an electrocoating material will be increased, whereby an aqueous resin is uniformly electrodeposited on the surface of the hydrated iron oxide film 57 and generation of pin holes can thus be suppressed. Further, the hydrated iron oxide film 57 can be bonded to a hydrophilic functional group of an aqueous resin that forms the upper resin coating layer 55 by, for example, hydrogen bonding. Thus, a high degree of adhesion between the hydrated iron oxide film 57 and the resin coating layer 55 is possible.

In the aforementioned manufacturing method, the method of imparting a desired surface roughness Ra to the surface of the resin coating layer 55 formed by electrodeposition coating can be either one of the aforementioned method of applying roughening treatment to the surface of the resin coating layer 55 with external force or the method in which an electrocoating material including desired fillers is used. In addition, the water used is desirably ion-exchange water, and the aqueous resin used is desirably a polyamide resin. A polyamide resin has an amide group and/or an imide group that are/is a hydrophilic functional group(s). Thus, it has high affinity for the hydrated iron oxide film 57 formed on the separator substrate 50. As a result, it has a high degree of adhesion to the hydrated iron oxide film 57 formed on the separator substrate 50. In particular, since the hydrated iron oxide film 57 formed on the separator substrate 50 has a mixed composition of hydroxide and oxide of iron, a number of hydroxyl groups and the like that are capable of bonding to an amide group and/or an imide group of a polyamide resin exist in a scattered manner on the surface of the hydrated iron oxide film 57. Thus, an electrocoating material including a polyamide resin as an aqueous resin can have high affinity for the hydrated iron oxide film 57 formed on the separator substrate 50, whereby the resin coating layer 55 with a uniform thickness can be formed.

In the separator formed in the aforementioned manner, bonding strength between each of the layers of the separator can be further increased. Thus, durability of a fuel cell unit to be formed can be further increased.

EXAMPLES

A fuel cell separator of the present invention will be described with reference to examples below. It should be appreciated that present invention is not limited to the following examples unless it otherwise departs from the sprit and scope thereof.

Example 1

A region of gas flow channels (a conducting section) of a separator substrate made of austenitic stainless steel SUS was masked. With the masked separator substrate as a negative electrode and with a plate made of ferritic stainless steel SUS 430 as a positive electrode, the masked separator substrate was immersed in an electrodeposition bath containing a 20 mass % cationic electrocoating material (insuleed 4200: a product of Nippon Paint Co., Ltd.) that includes an aqueous polyamide imide resin, with the following conditions: a coating ratio of +/−electrodes of −1/2, an interelectrode distance of 15 cm, and a liquid temperature of 30° C. The voltage applied was gradually increased such that the voltage reached a predetermined level in five seconds. After having reached the predetermined level, the applied voltage was maintained for 115 to 145 seconds, so that cationic electrodeposition coating was performed. Then, the masking material was removed and baking at 200° C. was performed for 30 minutes, whereby a separator A with a resin coating layer formed was obtained. The surface roughness Ra of the thus obtained resin coating layer of the separator A was measured with a surface roughness meter (Surftest SJ-201: a product of Mitutoyo Corporation) and it was found to be 0.2 μm.

Three separators A each having the aforementioned resin coating layer were prepared, and the surface of each resin coating layer was subjected to surface roughness treatment through shot blasting, so that separators B, C, and D having mean surface roughnesses Ra of 0.5 μm, 1.0 μm, and 1.5 μm, respectively, were obtained. Note that adjustment of the surface roughness through shot blasting was accomplished with the control of shot pressure.

Figure 5:
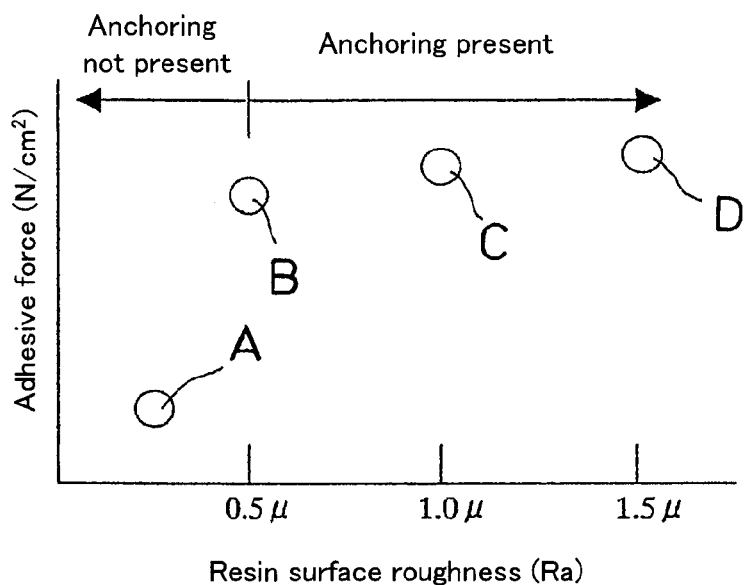
FIG. 5 is a graph showing the relationship between the resin surface roughness (Ra) and adhesive force according to Embodiment 1.

As an adhesive, a thermosetting silicon resin was bonded to the surface of each of the resin coating layers of the separator A and the separators B, C, and D that had been subjected to the surface roughness treatment. After the silicon resin had been bonded, it was left intact for 24 hours and then a T-peel test of the bonding interface was performed by means of a tensile strength test. The surface roughness was measured with a surface roughness meter (Surftest SJ-400: a product of Mitutoyo Corporation). FIG. 5 is a graph showing the test result. As shown in the graph of FIG. 5, the surface roughness Ra of the resin coating layer that has not been subjected to surface roughening treatment is as low as 0.2 μm and the adhesive force thereof is about 3 N/cm$^2$, since an anchoring effect does not act on the bonding interface, whereas the resin coating layers, each of which has a surface roughness Ra that is greater than or equal to 0.5 μm as a result of having been subjected to the surface roughening treatment, have adhesive forces greater than or equal to the integral multiple of that of a resin coating layer that had not been subjected to surface roughening treatment.

Example 2

A region of gas flow channels (a conducting section) of a separator substrate made of austenitic stainless steel SUS was masked. With the masked separator substrate as a negative electrode and with a plate made of ferritic stainless steel SUS 430 as a positive electrode, the masked separator substrate was immersed in three kinds of electrodeposition baths each containing a 20 mass % cationic electrocoating material (insuleed 4200: a product of Nippon Paint Co., Ltd.) that includes an aqueous polyamide imide resin, to which acrylic resin particles with a volume mean particle diameter of 50 to 100 nm accounting for 5 mass %, 10 mass %, and 15 mass %, respectively, were added as fillers, with the following conditions: a coating ratio of +/−electrodes of −1/2, an interelectrode distance of 15 cm, and a liquid temperature of 30° C. The voltage applied was gradually increased such that the voltage reached a predetermined level in five seconds. After having reached the predetermined level, the applied voltage was maintained for 115 to 145 seconds, so that cationic electrodeposition coating was performed. Then, the masking material was removed and baking at 200° C. was performed for 30 minutes, whereby three kinds of separators E, F, and G with resin coating layers formed were obtained.

Figure 6:
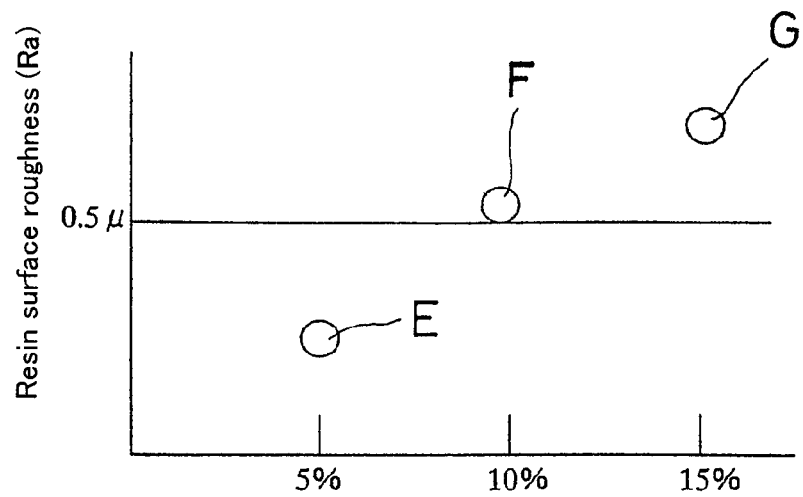
FIG. 6 is a graph showing the relationship between the content of fillers and resin surface roughness (Ra) according to Embodiment 2.
Figure 7:
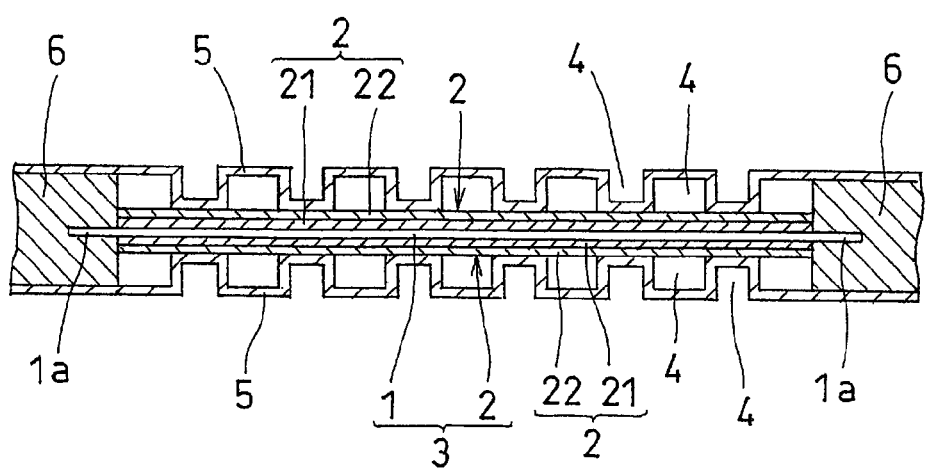
FIG. 7 is a schematic view for illustrating a fuel cell unit.

The surface roughnesses Ra of the resin coating layers of the separator substrates E, F, and G were measured with a surface roughness meter (Surftest SJ-201: a product of Mitutoyo Corporation). The graph of FIG. 6 shows the results. As shown in the graph, the roughness Ra of the resin surface of the separator substrate E with a filler content of 5 mass % is about 0.3 μm, the roughness Ra of the resin surface of the separator substrate F with a filler content of 10 mass % is over 0.5 μm, and the roughness Ra of the resin surface of the separator substrate G with a filler content of 15 mass % is about 0.8 μm.

The aforementioned test results can confirm that controlling the content of fillers in an electrocoating material will make it possible to control the surface roughness Ra of a resin coating layer obtained through electrodeposition coating, and that using an electrocoating material including fillers in amounts greater than or equal to 10 mass % can provide a resin coating layer with a surface roughness of greater than or equal to 0.5 μm.

It is estimated that when a thermosetting silicon resin is bonded to each of the surfaces of the resin coating layers of the thus formed separator substrates F and G in a similar manner as that described in Example 1, adhesive force that is substantially equal to those of the separators B, C, and D that have been subjected to surface roughening treatment in Example 1 can be obtained.

[Industrial Applicability]

A fuel cell separator and a method for manufacturing the same of the present invention can be used for any applications of the field of fuel cells. In particular, the present invention can be advantageously applied to polymer electrolyte fuel cells of vehicles.

What is claimed is:

1. A fuel cell separator, comprising:
    a separator substrate made of a metal plate; and
    an anticorrosion resin coating layer formed thereon,
    wherein the resin coating layer is formed on a portion excluding a conducting section of the separator substrate,
    wherein the resin coating layer has a first surface and a second surface, the first surface of the resin coating layer facing away from the separator substrate, and the second surface of the resin coating layer facing toward the separator substrate, and
    wherein the first surface of the resin coating layer has a surface roughness Ra, and the surface roughness Ra is 0.5 to 13.5 μm, and the second surface of the resin coating layer is substantially flat.

2. The fuel cell separator according to claim 1, wherein the resin coating layer includes fillers, and the surface roughness Ra is provided by the presence of the fillers.

3. The fuel cell separator according to claim 2, wherein the fillers are acrylic resin particles each with a particle diameter of 50 to 100 nm.

4. The fuel cell separator according to claim 1, wherein the surface roughness Ra is provided by roughening treatment applied to a surface of the resin coating layer formed.

5. The fuel cell unit comprising a membrane electrode assembly sandwiched between the fuel cell separators according to claim 1.

6. The fuel cell separator according to claim 2, wherein an electrocoating material including acrylic resin particles each with a particle diameter of 50 to 100 nm as fillers is used as the electrocoating material.

7. The fuel cell separator according to claim 6, wherein a content of the fillers in the electrocoating material is greater than or equal to 10 mass %.

8. The fuel cell separator according to claim 1, further comprising:
    a hydrated metal oxide layer disposed on the metal plate; and
    a water-treated layer disposed on the hydrated metal oxide layer;
    wherein the anticorrosion resin coating layer is formed on the water-treated layer.

9. The fuel cell separator according to claim 1, wherein the first surface having the surface roughness Ra is configured to adhere to an adhesive layer or a gasket.

* * * * *